United States Patent [19]

Hitomi et al.

[11] Patent Number: 5,033,268
[45] Date of Patent: Jul. 23, 1991

[54] INTAKE SYSTEM FOR TURBOCHARGED ENGINE

[75] Inventors: Mitsuo Hitomi; Toshio Nishikawa; Humio Hinatase; Novuo Takeuti, all of Hiroshima, Japan

[73] Assignee: Mazda Motor Corporation, Hiroshima, Japan

[21] Appl. No.: 323,952

[22] Filed: Mar. 15, 1989

[30] Foreign Application Priority Data

Mar. 15, 1988 [JP] Japan .................. 63-61143
Apr. 27, 1988 [JP] Japan .................. 63-105107

[51] Int. Cl.⁵ .................. F02B 37/00; F02B 27/00
[52] U.S. Cl. .................. 60/605.1; 123/52 MB; 123/559.1
[58] Field of Search .................. 60/605.1; 123/559.1, 123/52 M, 52 MB, 65 BA

[56] References Cited

U.S. PATENT DOCUMENTS

| 4,300,488 | 11/1981 | Cser .................. 123/52 M |
| 4,829,941 | 5/1989 | Hitomi et al. . |
| 4,846,117 | 7/1989 | Hitomi et al. . |
| 4,858,570 | 8/1989 | Matsumoto et al. . |
| 4,889,082 | 12/1989 | Hitomi et al. . |

FOREIGN PATENT DOCUMENTS

| 182223 | 5/1986 | European Pat. Off. .......... 123/52 M |
| 57-2892 | 1/1982 | Japan . |
| 58-178421 | 11/1983 | Japan . |
| 60-81228 | 6/1985 | Japan . |
| 60-184924 | 9/1985 | Japan . |
| 60-198324 | 10/1985 | Japan . |
| 241418 | 10/1986 | Japan .................. 123/52 M |
| 291431 | 12/1986 | Japan .................. 60/605.1 |
| 48922 | 3/1987 | Japan .................. 123/52 M |
| 62-87615 | 4/1987 | Japan . |
| 2121875 | 1/1984 | United Kingdom ............. 123/52 M |

Primary Examiner—Douglas Hart
Attorney, Agent, or Firm—Sixbey, Friedman, Leedom & Ferguson

[57] ABSTRACT

A turbocharged engine is provided with a waste gate valve which limits the supercharging pressure in the intake passage downstream of the compressor of the turbocharger not to exceed a predetermined value. The intake passage has first and second pressure propagating paths downstream of the compressor. The pressure wave generated by the intake stroke of the combustion chamber is propagated substantially along the first pressure propagating path when the engine operates at a speed in a low engine speed range under heavy load and substantially along the second pressure propagating path when the engine operates at a speed in a high engine speed range. The part of the intake passage defining the first pressure propagating path is arranged so that a supercharging effect by a kinetic effect of intake air which becomes maximum at a predetermined engine speed in the low engine speed range can be obtained, and the part of the intake passage defining the second pressure propagating path is arranged so that a supercharging effect by a kinetic effect of intake air is better in the high engine speed range when the pressure wave is propagated along the second pressure propagating path than when the pressure wave is propagated along the first pressure propagating path. The predetermined engine speed is lower than an intercept engine speed for the second intake path.

17 Claims, 10 Drawing Sheets

INTAKE SYSTEM FOR TURBOCHARGED ENGINE

BACKGROUND OF THE INVENTION

1. Field of the Invention

This invention relates to an intake system for an engine provided with a turbocharger.

2. Description of the Prior Art

There has been a great demand for increase in the engine output torque of a turbocharged engine in the low engine speed range. That is, since the exhaust pressure is low in the low engine speed range, the engine cannot be satisfactorily supercharged by the turbocharger. Further, as is well known, in the turbocharged engine, combustion energy can be better used and fuel economy can be improved over the entire operating range of the engine by increasing the geometric compression ratio to at least 9, preferably to at least 10. However, when the geometric compression ratio is increased to such an extent, the effective compression ratio is increased and the temperature of the air-fuel mixture is increased to generate knocking of the engine. Although the occurrence of engine knock can be suppressed by retarding the intake valve closing timing, thereby reducing the effective compression ratio, if the intake valve closing timing is simply retarded, the air-fuel mixture will be blown back into the intake passage in the low engine speed range. This, coupled with the fact that the charging effect of the turbocharger is poor in the low engine speed range, further reduces the engine output torque in the low engine speed range.

In order to compensate for the reduction in the engine output torque in the low engine speed range by supercharging the engine by a kinetic effect of intake air, the intake system must be arranged so that the engine can be supercharged by the kinetic effect of intake air at a substantially low engine speed. However, when the intake system is so arranged, the intake system will act to reduce the intake air charging efficiency at the high engine speed range and the engine output torque will be lowered in spite of supercharging by the turbocharger.

SUMMARY OF THE INVENTION

In view of the foregoing observations and description, the primary object of the present invention is to provide an intake system for a turbocharged engine which can increase the engine output torque in the low engine speed range without adversely affecting the engine output torque in the high engine speed range.

Another object of the present invention is to provide an intake system for a turbocharged engine which can accomplish the above object and at the same time, can reduce the effective compression ratio to suppress the engine knock.

In one aspect of the present invention, there is provided an intake system for an engine comprising an intake passage which communicates with a combustion chamber of the engine at one end and with the atmosphere at the other end, a turbocharger which has a turbine disposed in an exhaust passage of the engine to be rotated under the pressure of exhaust gas flowing through the exhaust passage and a compressor disposed in the intake passage and operatively connected to the turbine to be driven by the turbine, a supercharging pressure control means which limits the supercharging pressure downstream of the compressor not to exceed a predetermined value, said intake passage having first and second pressure propagating paths downstream of the compressor, and a switching means which changes the pressure propagating paths so that the pressure wave generated by the intake stroke of the combustion chamber is propagated substantially along the first pressure propagating path when the engine operates at a speed in a low engine speed range under heavy load and substantially along the second pressure propagating path when the engine operates at a speed in a high engine speed range, the part of the intake passage defining the first pressure propagating path being arranged so that a supercharging effect by a kinetic effect of intake air which becomes maximum at a predetermined engine speed in the low engine speed range can be obtained, the part of the intake passage defining the second pressure propagating path being arranged so that a supercharging effect by a kinetic effect of intake air is better in the high engine speed range when the pressure wave is propagated along the second pressure propagating path than when the pressure wave is propagated along the first pressure propagating path, said predetermined engine speed being lower than an intercept engine speed for the second pressure propagating path which is the engine speed at which the supercharging pressure control means will begin to operate to lower the supercharging pressure when the engine speed is increased with the throttle valve wide opened while the pressure wave is propagated along the second pressure propagating path.

In another aspect of the present invention, there is provided an intake system for an engine comprising an intake passage which communicates with a combustion chamber of the engine at one end by way of an intake port and with the atmosphere at the other end, an intake valve for opening and closing the intake port, a turbocharger which has a turbine disposed in an exhaust passage of the engine to be rotated under the pressure of exhaust gas flowing through the exhaust passage and a compressor disposed in the intake passage and operatively connected to the turbine to be driven by the turbine, a supercharging pressure control means which limits the supercharging pressure downstream of the compressor not to exceed a predetermined value, said intake passage having first and second pressure propagating paths downstream of the compressor, and a switching means which changes the pressure propagating paths so that the pressure wave generated by the intake stroke of the combustion chamber is propagated substantially along the first pressure propagating path when the engine operates at a speed in a low engine speed range under heavy load and substantially along the second pressure propagating path when the engine operates at a speed in a high engine speed range, the part of the intake passage defining the first pressure propagating path being arranged so that a supercharging effect by a kinetic effect of intake air which becomes maximum at a predetermined engine speed in the low engine speed range can be obtained, the part of the intake passage defining the second pressure propagating path being arranged so that a supercharging effect by a kinetic effect of intake air is better in the high engine speed range when the pressure wave is propagated along the second pressure propagating path than when the pressure wave is propagated along the first pressure propagating path, and the closure timing of said intake valve being set not before 40 degrees past BDC, the intake valve being considered to be closed when the valve lift is not more than 1 mm.

As disclosed in our Japanese Unexamined Patent Publication Nos. 62(1987)-121828, 61(1986)-157716, and the like, there have been known two types of intake systems which are arranged to supercharge engines by virtue of a kinetic effect of intake air, one being a type utilizing an inertia tuning effect of the intake air and the other being a type utilizing a resonance tuning effect of the intake air. The former will be referred to as "the inertia-supercharging intake system" and the supercharging by the inertia-supercharging intake system will be referred to as "the inertia-supercharging," hereinbelow. Similarly, the latter will be referred to as "the resonance-supercharging intake system", and the supercharging by the resonance-supercharging intake system will be referred to as "the resonance-supercharging", hereinbelow.

The engine speed at which the supercharging effect by the kinetic effect of intake air becomes maximum is defined to be the engine speed at which the volumetric efficiency becomes maximum, the volumetric efficiency being represented by the following formula.

$$Ve = G/Pl \cdot Vn$$

wherein Ve represents the volumetric efficiency, G represents the mass of gas actually introduced into the combustion chamber, Pl represents the density of gas in the intake passage downstream of the compressor of the turbocharger, and Vn represents the volume of the combustion chamber when the piston is at BDC.

The engine speed at which the supercharging effect by the kinetic effect of intake air becomes maximum will be referred to as "the tuning engine speed", hereinbelow. The tuning engine speed depends upon the length, the diameter, the volume and the like of the intake passage, and can be mathematically determined as will be described in detail later in conjunction with embodiments of the present invention.

DESCRIPTION OF THE PREFERRED EMBODIMENTS

Figure 1:
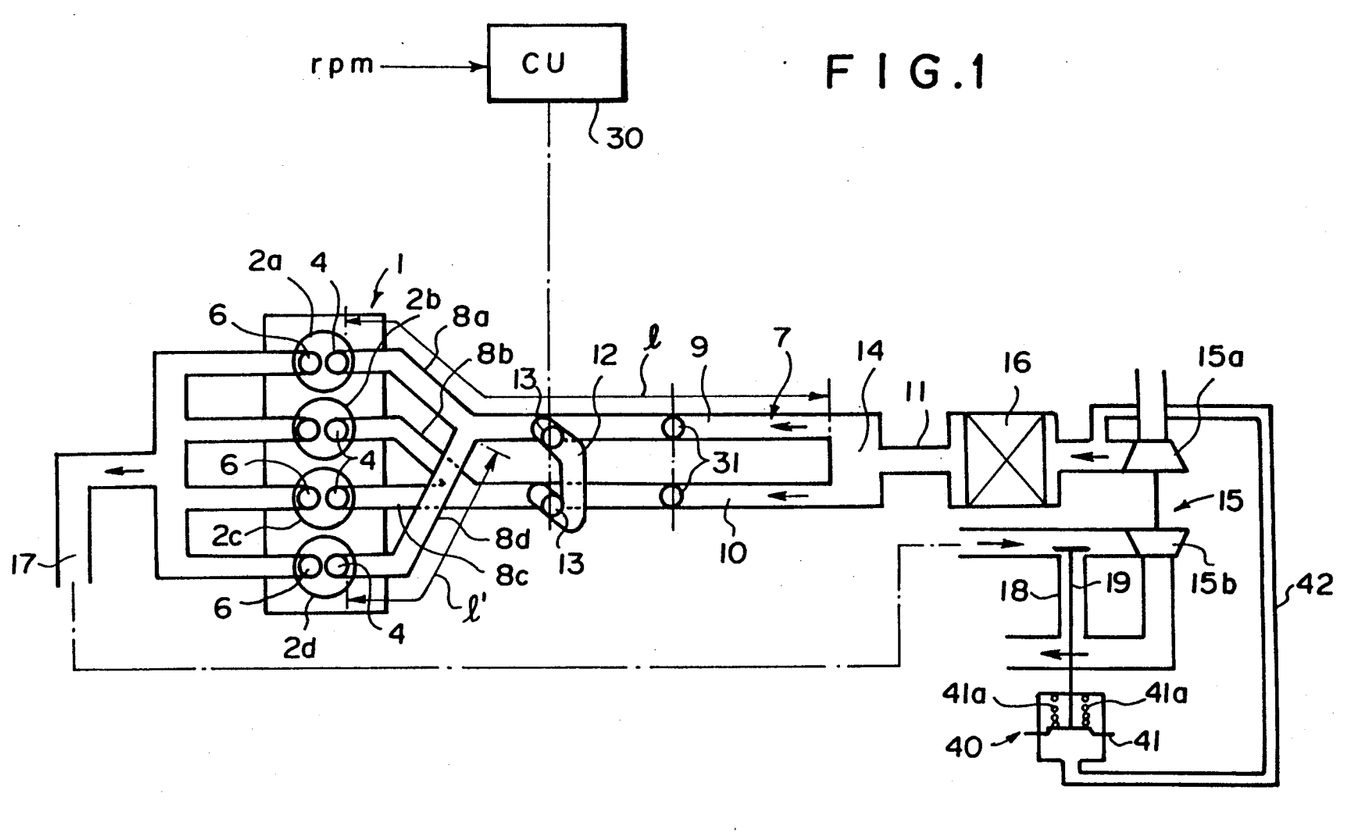
FIG. 1 is a schematic view showing an engine provided with an intake system in accordance with an embodiment of the present invention.

In FIG. 1, a four-cylinder engine 1 provided with an intake system in accordance with an embodiment of the present invention has first to fourth cylinders 2a to 2d arranged in line. The firing order is 1-3-4-2. Each cylinder is provided with an intake port 4 which is opened and closed at predetermined timings by an intake valve (not shown) and an exhaust port 6 which is opened and closed at predetermined timings by an exhaust valve (not shown). The intake ports 4 for the respective cylinders 2a to 2d are communicated with the atmosphere by way of an intake passage 7. The intake passage 7 comprises discrete intake passages 8a to 8d respectively connected to the cylinders 2a to 2d, a first branch intake passage 9 to which the upstream ends of the discrete intake passages 8a and 8d for the first and fourth cylinders 2a and 2d are connected and a second branch intake passage 10 to which the upstream ends of the discrete intake passages 8b and 8c for the second and third cylinders 2b and 2c are connected. That is, the discrete intake passages for two cylinders the intake strokes of which differ from each other in timing by 360 degrees are merged together and connected to one branch intake passage. In other words, the two cylinders connected to each of the first and second branch intake passages 9 and 10 do not fire one after the other. The upstream ends of the first and second branch intake passages 9 and 10 are merged together to form a junction 14 and the Junction 14 is communicated with the atmosphere by way of a common intake passage 11 which is provided with an air cleaner (not shown) at the upstream end. The first and second branch intake passages 9 and 10 are communicated with each other by a communicating passage 12 at respective intermediate portions. A pair of on-off valves 13 are provided on opposite ends of the communicating passage 12 to open and close the communicating passage 12 in synchronization with each other under the control of a control unit 30. The unction 14 of the first and second branch intake passages 9 and 10 forms a first pressure reflecting portion and the communicating passage 12 forms a second pressure reflecting portion. Throttle valves 31 for controlling the amount of intake air are disposed in the respective branch intake passages 9 and 10.

A compressor 15a of a turbocharger 15 is disposed in the common intake passage 11 downstream of the air cleaner (not shown), and an intercooler 16 is disposed downstream of the compressor 15a. The exhaust ports 6 are communicated with the atmosphere by way of an exhaust passage 17, and a turbine 15b of the turbocharger 15 is disposed in the exhaust passage 17 and is drivingly connected with the compressor 15a to pressurize intake air under the pressure of exhaust gas. The exhaust passage 17 is provided with a bypass passage 18 connected thereto to bypass the turbine 15b of the turbocharger 15. The bypass passage 18 is normally closed by a waste gate valve 19 and is opened when the pressure in the intake passage 7 downstream of the compressor 15a exceeds a predetermined value. That is, the waste gate valve 19 is connected to a diaphragm 41 of an actuator 40. The diaphragm 41 is urged to close the waste gate valve 19 by springs 41a and is subjected to the pressure in the intake passage 7 downstream of the compressor 15a by way of a communicating passage 42 which pushes the diaphragm 41 to open the waste gate valve 19. The spring force of the springs 41a is selected so that the pressure acting on the diaphragm 41 overcomes the force of the springs 1a to open the waste gate valve 19 when the engine speed reaches a predetermined value as will become apparent later.

The control unit 30 closes the on-off valves 13 to break the communication between the first and second branch intake passages 9 and 10 by way of the communicating passage 12 when the engine speed is in a low engine speed range, and opens the same when the engine speed is in a high engine speed range.

Figure 2A:
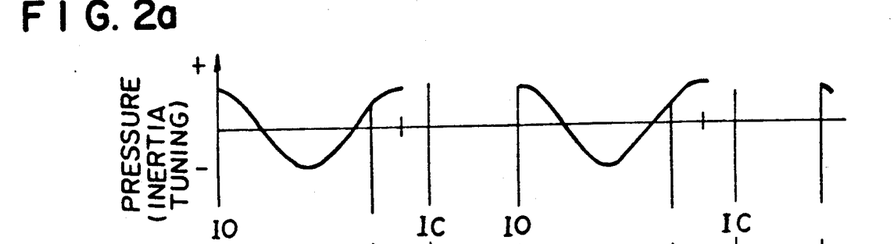
FIGS. 2a and 2b are views for illustrating the supercharging effect by the kinetic effect of intake air.

The intake system of this embodiment is arranged so that an inertia supercharging effect which becomes maximum at an engine speed N1 in the low engine speed range can be obtained when the on-off valves 13 are closed. That is, when the on-off valves 13 are closed, a negative pressure wave (FIG. 2-a) generated near the intake port 4 for one of the cylinders at the beginning of the intake stroke of the cylinder is propagated upstream along the corresponding branch intake passage (9 or 10) and is reflected at the first pressure reflecting portion (the junction of the first and second branch intake passages) 14. The negative pressure wave is converted into a positive pressure wave when it is reflected and the positive pressure wave is propagated downstream and acts on the intake port 4 of the same cylinder, whereby a larger amount of intake is forced into the cylinder.

Further, the intake system of this embodiment is arranged so that an inertia supercharging effect which becomes maximum at an engine speed N2 in the high engine speed range can be obtained when the on-off valves 13 are opened. That is, when the on-off valves 13 are opened, a negative pressure wave (FIG. 2-a) generated near the intake port 4 for one of the cylinders at the beginning of the intake stroke of the cylinder is propagated upstream along the corresponding branch intake passage (9 or 10) and is reflected at the second pressure reflecting portion (the communicating passage) 12 which is nearer to the cylinder than the first pressure reflecting portion 14. The negative pressure wave is converted into a positive pressure wave when it is reflected and the positive pressure wave is propagated downstream and acts on the intake port 4 of the same cylinder, whereby a larger amount of intake is forced into the cylinder.

Figure 2B:
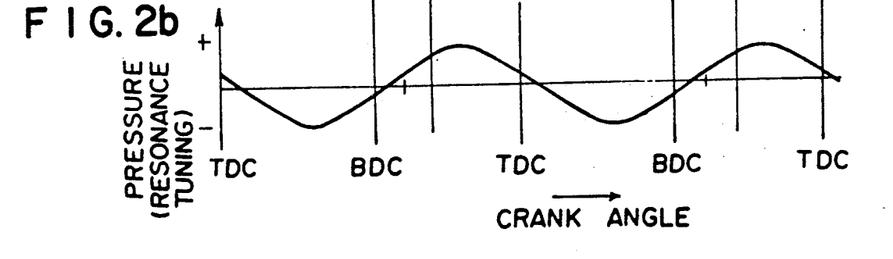

Further, the intake system of this embodiment is arranged so that a resonance supercharging effect which becomes maximum at an engine speed N3 higher than the engine speed N2 can be obtained when the on-off valves 13 are opened. In the resonance supercharging, a positive pressure wave (FIG. 2-b) generated at the end of the intake stroke of one of the cylinders which are connected to the same branch intake passage (9 or 10) and the intake strokes of which differ from each other in timing by 360 degrees acts on the intake port 4 for the other cylinder to force a larger amount of intake air into the cylinder. In FIG. 2, TDC denotes the top dead center, BDC denotes the bottom dead center, IO denotes the intake valve opening timing and IC denotes the intake valve closure timing.

When the engine speed is gradually increased with the throttle valves 31 wide opened, the pressure in the intake passage 7 downstream of the compressor 15a is gradually increased. When the pressure reaches a predetermined value, the waste gate valve 19 begins to open the bypass passage 18. When the bypass passage 18 is opened, a part of exhaust gas flows through the bypass passage 18 and the amount of exhaust gas which serves to rotate the turbine 15b is limited, whereby the supercharging pressure is limited substantially to the predetermined value. The pressure in the intake passage 7 downstream of the compressor reaches the predetermined value at a lower engine speed when the on-off valves 13 are closed than when the on-off valves 13 are opened. The engine speed at which the pressure reaches the predetermined value will be referred to as "the intercept engine speed", hereinbelow, and the intercept engine speed when the on-off valves 13 are closed will be referred to as "the intercept engine speed for the lower speed pressure propagating path", and that when the on-off valves 13 are opened will be referred to as "the intercept engine speed for the higher speed pressure propagating path", hereinbelow.

Figure 3:
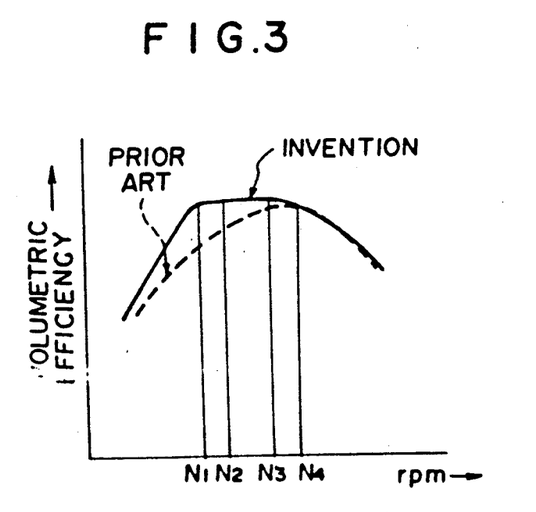
FIG. 3 is a view showing the effect of the intake system shown in FIG. 1.

In accordance with the present invention, the tuning engine speed N1 for the lower speed pressure propagating path, i.e., the engine speed at which the inertia supercharging effect is maximized when the on-off valves 13 are closed, is set to be lower than the intercept engine speed for the higher speed pressure propagating path. In this particular embodiment, the intercept engine speed for the higher speed pressure propagating path is higher than the resonance tuning engine speed N3 as shown in FIG. 3 wherein the intercept engine speed for the higher speed pressure propagating path is indicated as N4.

Figures 4, 5:
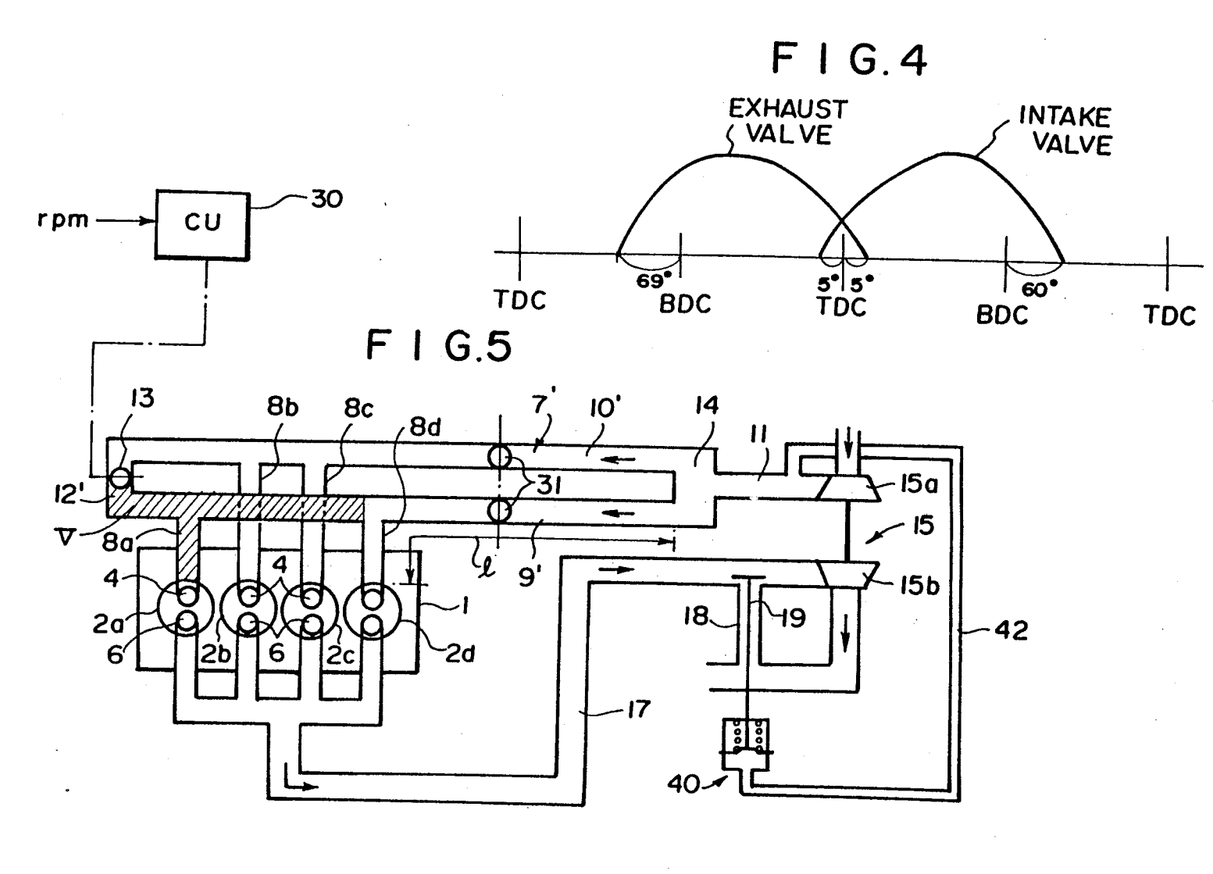
FIG. 4 is a view four illustrating the valve timing of the intake system shown in FIG. 1.
FIG. 5 is a schematic view showing an engine provided with an intake system in accordance with another embodiment of the present invention.

Further, in this particular embodiment, the intake valves are closed at 60 degrees after BDC as shown in FIG. 4. The intake valves are considered to be closed when the valve lift is not larger than 1 mm.

In the intake system of this embodiment, the volumetric efficiency can be satisfactorily increased in the low engine speed range, where conventionally the effect of the turbocharger 15 has been unsatisfactory due to poor exhaust gas pressure, by the inertia supercharging effect of intake air. Further, since the supercharging effect by the kinetic effect of intake air can be obtained also in the high engine speed range lower than the intercept engine speed for the higher speed pressure propagating path by opening the on-off valves 3, the volumetric efficiency in the low engine speed range can be improved without sacrificing the volumetric efficiency in the high engine speed range as shown in FIG. 3.

Further since the closure timing of the intake valves is retarded and the intake valves are closed after the piston passes the BDC, the effective compression ratio is reduced. However, by virtue of the supercharging effect by the kinetic effect of intake air, the volumetric efficiency is increased on the contrary as can be understood from FIG. 3. At the same time, unlike the supercharging by the turbocharger 15, the supercharging by the kinetic effect of intake air does not raise the temperature of the air-fuel mixture introduced into the combustion, and accordingly, occurrence of the engine knock can be suppressed.

The tuning engine speed can be set to a desired value by selecting the length, the diameter, the volume and the like of the pressure propagating system. For example, the inertia tuning engine speed N1 for the lower speed pressure propagating path in this embodiment can be determined on the basis of the following formula.

$$N1 = \theta v/6$$

wherein $\theta$ represents the crank angle degrees for which the intake valve is opened, and v represents the natural frequency of the air column in the intake passage consisting of the part of one of the branch intake passages downstream of the junction 14 and the discrete intake passages connected to the branch intake passage. The natural frequency v is given by the following formula.

$$v = a/4(1 + l' \cdot f'/f + Vm/f)$$

wherein l represents the length in meter of the intake passage between one (e.g., 2a) of the cylinders connected to the same branch intake passage (e.g., 9) and the first pressure reflecting portion 14, f represents the mean cross-sectional area in square meter of the intake passage between said one cylinder and the first pressure reflecting portion 14, l' represents the length in meter of the intake passage between the other cylinder (e.g., d) and the junction of the discrete intake passages 8a and 8d for the two cylinders (i.e., the length of the discrete intake passage 8d), f' represents the mean cross-sectional area in square meters of the intake passage between the other cylinder (e.g., 2d) and the junction of the discrete intake passages 8a and 8d for the two cylinders, a represents the speed of sound, and Vm represents the mean volume in solid meter of the combustion chamber during the time the intake valve is opened.

The inertia tuning engine speed N2 for the higher speed pressure propagating path in this embodiment can be determined in the similar manner by substituting the length of the intake passage between one of the cylinders and the second pressure reflecting portion 12 and the mean cross-sectional area of the same for l and f in the above formula respectively.

FIG. 5 shows another embodiment of the present invention. In FIG. 5, the parts analogous to the parts shown in FIG. 1 are given the same reference numerals and will not be described in detail, here. In this embodiment, the discrete intake passages 8a and 8d for the first and fourth cylinders 2a and 2d are connected to a first branch intake passage 9' and the discrete intake passages 8b and 8c for the second and third cylinders 2b and 2c are connected to a second branch intake passage 10'. The upstream ends of the respective branch intake passages 9' and 10' are merged together to form a unction 14 to which the downstream end of the common intake passage 11 is connected. The junction 14 defines a first pressure reflecting portion. The first and second branch intake passages 9' and 10' are connected to each other by way of a communicating passage 12' which defines a second pressure reflecting portion. The communicating passage 12' is provided with an on-off valve 13 which opens and closes the communicating passage 12' under the control of the control unit 30.

As in the embodiment described above, the intake system of this embodiment is arranged so that an inertia supercharging effect which becomes maximum at an engine speed N1 in the low engine speed range can be obtained when the on-off valve 13 is closed. That is, when the on-off valve 13 is closed, a negative pressure wave generated near the intake port 4 for one of the cylinders at the beginning of the intake stroke of the cylinder is propagated upstream along the corresponding branch intake passage (9' or 10') and is reflected at the first pressure reflecting portion (the junction of the first and second branch intake passages) 14. The negative pressure wave is converted into a positive pressure wave when it is reflected and the positive pressure wave is propagated downstream and acts on the intake port 4 of the same cylinder, whereby a larger amount of intake is forced into the cylinder.

Further, the intake system of this embodiment is arranged so that an inertia supercharging effect which becomes maximum at an engine speed N2 in the high engine speed range can be obtained when the on-off valve 13 is opened. That is, when the on-off valve 13 is opened, a negative pressure wave generated near the intake port 4 for one of the cylinders at the beginning of the intake stroke of the cylinder is propagated upstream along the corresponding branch intake passage (9' or 10') and is reflected at the second pressure reflecting portion (the communicating passage) 12' which is nearer to the cylinder than the first pressure reflecting portion 14. The negative pressure wave is converted into a positive pressure wave when it is reflected and the positive pressure wave is propagated downstream and acts on the intake port 4 of the same cylinder, whereby a larger amount of intake is forced into the cylinder.

Further, the intake system of this embodiment is arranged so that a resonance supercharging effect which becomes maximum at an engine speed N3 higher than the engine speed N2 can be obtained when the on-off valve 13 is opened. In the resonance supercharging, a positive pressure wave generated at the end of the intake stroke of one of the cylinders which are connected to the same branch intake passage (9' or 10') and the intake strokes of which differ from each other in timing by 360 degrees is propagated along the upstream side portion of the branch intake passage and acts on the intake port 4 for the other cylinder to force a larger amount of intake air into the cylinder.

The inertia tuning engine speed N1 for the lower speed pressure propagating path in this embodiment can be determined on the basis of the following formula.

$$N1 = \theta v/6$$

wherein $\theta$ represents the crank angle degrees for which the intake valve is opened, and v represents the natural frequency of the air column in the intake passage consisting of the part of one of the branch intake passages between the junction 14 and the downstream side communicating passage 12' and the discrete intake passages connected to the branch intake passage. When the volume of the junction 14 is relatively small, v should represent the natural frequency of the air column in the intake passage consisting of the part of one of the branch intake passages between the junction 14, inclusive of half of the junction 14 itself, and the downstream side communicating passage 12' and the discrete intake passages connected to the branch intake passage. The natural frequency v is given by the following formula.

$$v = a/4(1 + V/f + Vm/f)$$

wherein l represents the length in meter of the intake passage between one (e.g., 2d) of the cylinders connected to the same branch intake passage (e.g., 9') and the first pressure reflecting portion 14, f represents the mean cross-sectional area in square meter of the intake passage between said one cylinder and the first pressure reflecting portion 14, V represents the sum of the volume of the intake passage between said one cylinder (2d) and the second pressure reflecting portion 12' and the volume of the discrete intake passage 8a for the other cylinder (2a), and Vm represents the mean volume in solid meter of the combustion chamber during the time the intake valve is opened.

Figure 6:
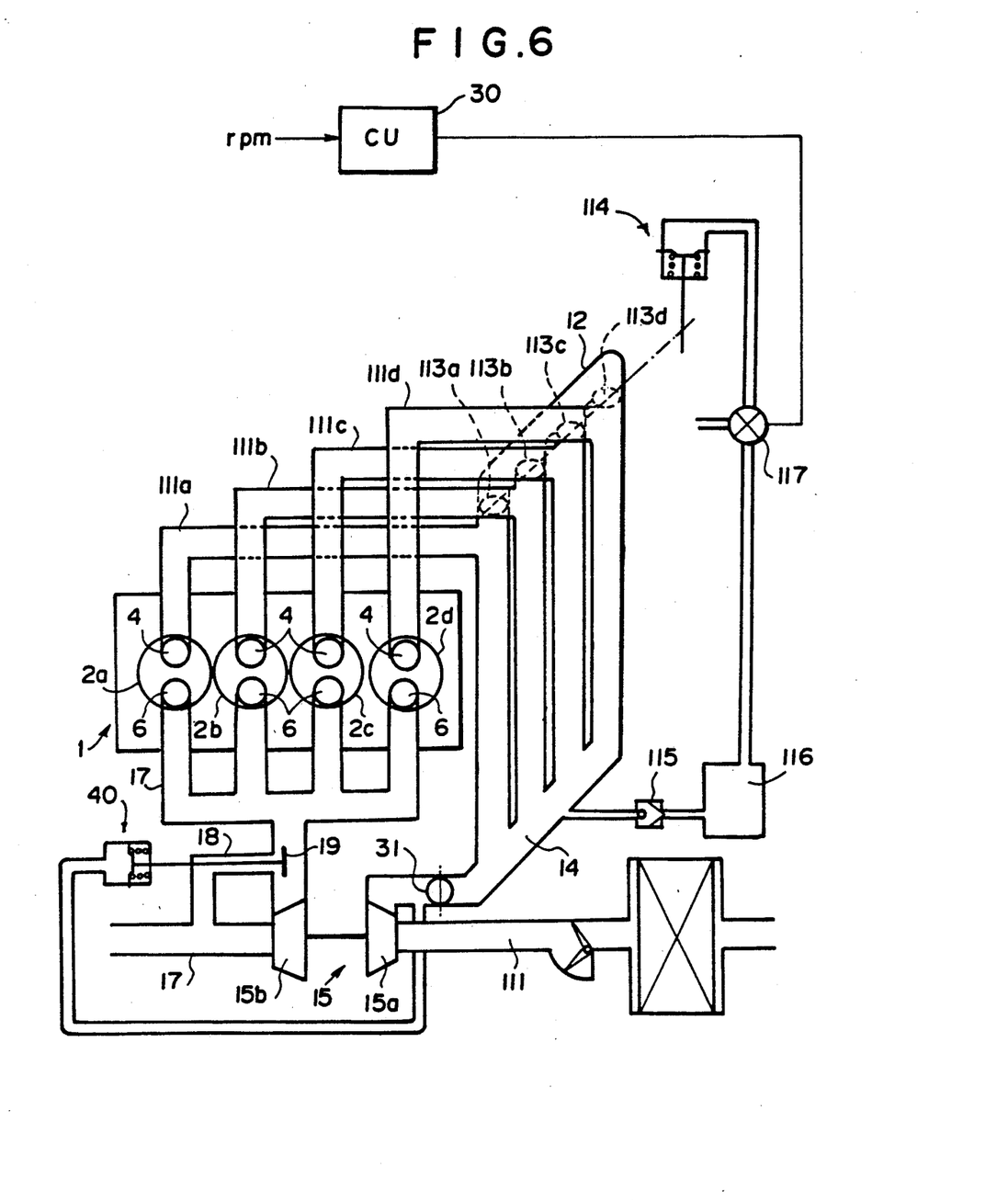
FIG. 6 is a schematic view showing an engine provided with an intake system in accordance with still another embodiment of the present invention.

FIG. 6 shows still another embodiment of the present invention. In FIG. 6, the parts analogous to the parts shown in FIG. 1 are given the same reference numerals and will not be described here.

In this embodiment, the cylinders 2a to 2d are connected to a common intake passage 111 by way of long discrete intake passages 111a to 111d which are merged together at the respective upstream ends to form a junction 14. The junction 14 defines the first pressure reflecting portion. The discrete intake passages 111a to 111d are communicated with each other by way of a communicating passage 12 at respective intermediate portions The communicating passage 12 defines the second pressure reflecting portion. The communicating passage 12 is provided with on-off valves 113a to 113d at the junctions thereof to the respective discrete intake passages 111a to 111d. The on-off valves 113a to 113d are interlocked with each other and are integrally opened and closed by an actuator 114 under the control of the control unit 30. The control unit 30 opens the on-off valves 113a to 113d in the high engine speed range. In FIG. 6, reference numerals 115 to 117 respectively denote a check valve, a negative pressure chamber and a three-way solenoid valve.

As in the embodiments described above, the intake system of this embodiment is arranged so that an inertia supercharging effect which becomes maximum at an engine speed N1 in the low engine speed range can be obtained when the on-off valve 13 is closed. That is, when the on-off valves 113a to 113d are closed, a negative pressure wave generated in each of the cylinders 2a to 2d at the beginning of the intake stroke of the cylinder is propagated upstream along the corresponding discrete intake passage and is reflected at the first pressure reflecting portion 14. The negative pressure wave is converted into a positive pressure wave when it is reflected and the positive pressure wave is propagated downstream and acts on the intake port 4 of the same cylinder, whereby a larger amount of intake is forced into the cylinder.

Further, the intake system of this embodiment is arranged so that an inertia supercharging effect which becomes maximum at an engine speed N2 in the high engine speed range can be obtained when the on-off valves 113a to 113d are opened. That is, when the on-off valves 113a to 113d are opened, a negative pressure wave generated in each of the cylinders 2a to 2d at the beginning of the intake stroke of the cylinder is propagated upstream along the corresponding discrete intake passage and is reflected at the second pressure reflecting portion 12. The negative pressure wave is converted into a positive pressure wave when it is reflected and the positive pressure wave is propagated downstream and acts on the intake port 4 of the same cylinder, whereby a larger amount of intake is forced into the cylinder.

Figure 7A:
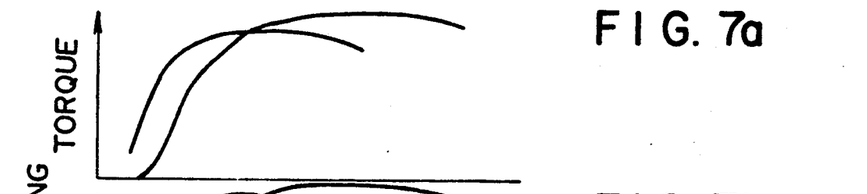
FIGS. 7a, 7b, 7c, and 7d are views showing the effect of the intake system shown in FIG. 6.
Figures 7B, 7C:
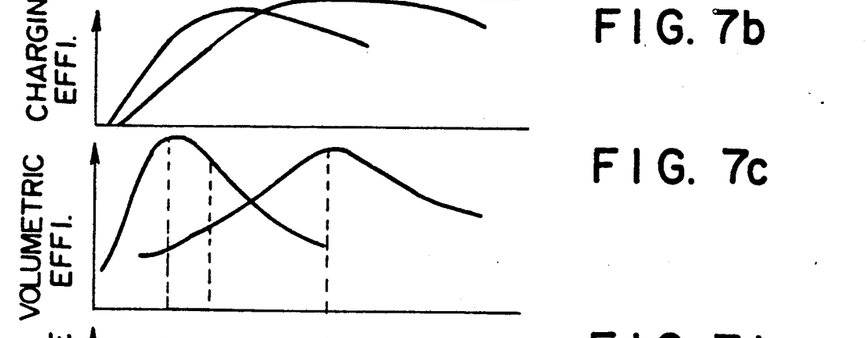
Figure 7D:
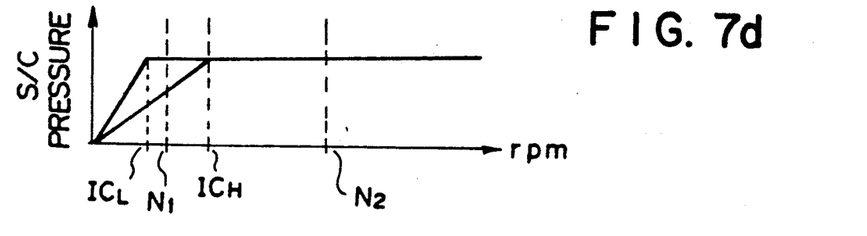

The tuning engine speed N1 for the lower speed pressure propagating path is set to be lower than the intercept engine speed for the higher speed pressure propagating path and higher than the intercept engine speed for the lower speed pressure propagating path, and the tuning engine speed N2 for the higher speed pressure propagating path is set to be higher than the intercept engine speed for the higher speed pressure propagating path as shown in FIG. 7. The intercept engine speed for the higher speed pressure propagating path and the intercept engine speed for the lower speed pressure propagating path are respectively indicated at $IC_H$ and $IC_L$ in FIG. 7.

In this embodiment, since the intake passage for each cylinder is separated from the intake passages for the other cylinders between the cylinder and the first pressure reflecting portion 14, each cylinder is not subjected to pressure waves generated by the other cylinders, and accordingly, the pressure wave generated by each cylinder is enhanced and a better inertia supercharging effect can be obtained at the respective tuning engine speeds N1 and N2.

In this embodiment, the engine output torque in the low engine speed range can be increased without adversely affecting the engine output torque in the high engine speed range as can be understood from FIG. 7. In FIG. 7, changes with the engine speed of the engine output torque, the charging efficiency, the volumetric efficiency and the supercharging pressure are shown. The charging efficiency is represented by the following formula.

$$CE = G/P0 \cdot Vn$$

wherein Ce represents the charging efficiency, G represents the mass of gas actually introduced into the combustion chamber, P0 represents the density of gas in the atmosphere, and Vn represents the volume of the combustion chamber when the piston is at BDC.

Figure 8:
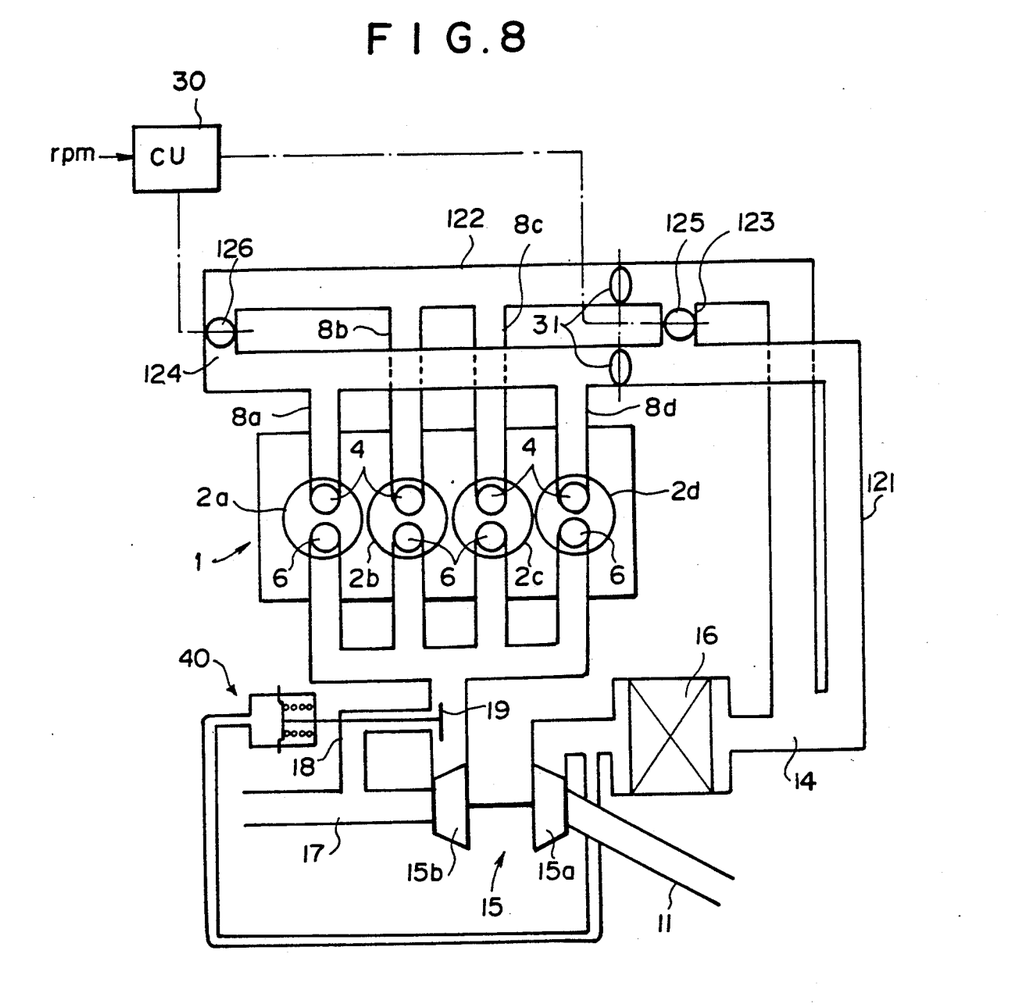
FIG. 8 is a schematic view showing an engine provided with an intake system in accordance with still another embodiment of the present invention.
Figure 9A:
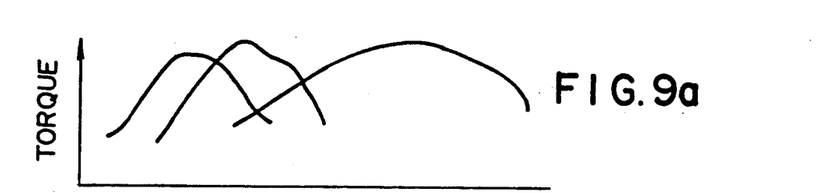
FIGS. 9a, 9b, 9c, 9d, 9e and 9f are views showing the effect of the intake system shown in FIG. 8.
Figure 9B:
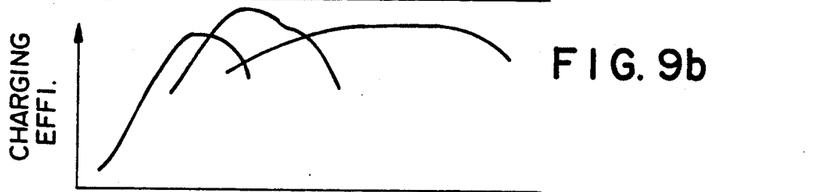
Figure 9C:
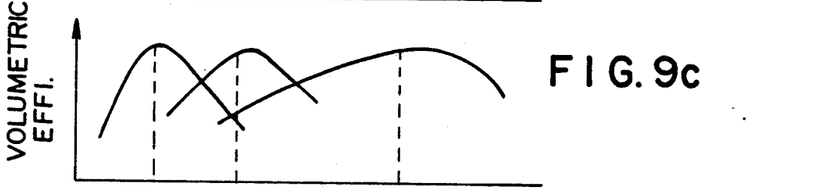
Figure 9D:
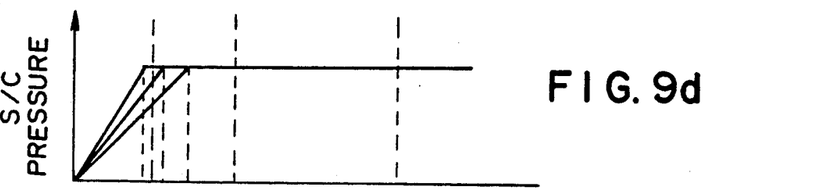
Figure 9E:
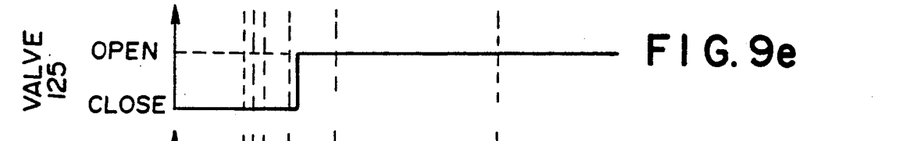
Figure 9F:
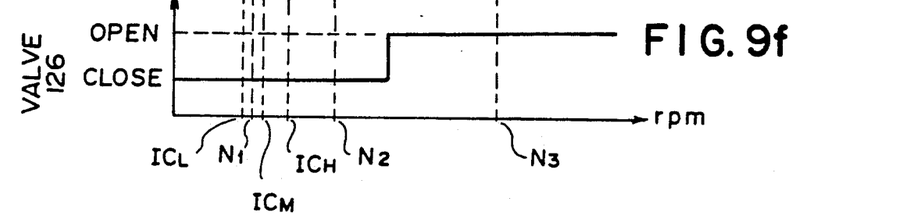

FIG. 8 shows still another embodiment of the present invention. In FIG. 8, the parts analogous to the parts shown in FIG. 1 are given the same reference numerals and will not be described here. In this embodiment, the first and fourth cylinders 2a and 2d are connected to a first branch intake passage 121 respectively by way of the discrete intake passages 8a and 8d, and the second and third cylinders 2b and 2c are connected to a second branch intake passage 122 respectively by way of the discrete intake passages 8b and 8c. The first and second branch intake passages 121 and 122 are merged together at the respective upstream ends to form a junction 14. The junction 14 defines a first pressure reflecting portion. The first and second branch intake passages 121 and 122 are communicated with each other at respective intermediate portions upstream of the junctions of the discrete intake passages to the branch intake passages by an upstream side communicating passage 123 and are communicated with each other by a downstream side communicating passage 124 at the respective downstream ends. The upstream side communicating passage 123 and the downstream side communicating passage 124 are respectively provided with first and second on-off valves 125 and 126. The upstream side communicating passage 123 defines a second pressure reflecting portion and the downstream side communicating passage 124 defines a third pressure reflecting portion. The first and second on-off valves 125 and 126 are both closed in a low engine speed range, and as the engine speed increases, the first on-off valve 125 is first opened at a first predetermined engine speed and the second on-off valve 126 is then opened at a second predetermined engine speed which is higher than the first predetermined engine speed. That is, in the engine speed range higher than the second predetermined engine speed both the first and second on-off valves 125 and 126 are opened.

In this embodiment, the intake system is arranged to have three tuning engine speeds, i.e., a tuning engine speed for the lower speed pressure propagating path N1, a tuning engine speed for the middle speed pressure propagating path N2 and a tuning engine speed for the higher speed pressure propagating path N3. The tuning engine speed for the lower speed pressure propagating path N1 is set to be higher than the intercept engine speed for the lower speed pressure propagating path $IC_L$ and to be lower than the intercept engine speeds for the middle and higher speed pressure propagating paths $IC_M$ and $IC_H$, as shown in FIG. 9.

Figure 10:
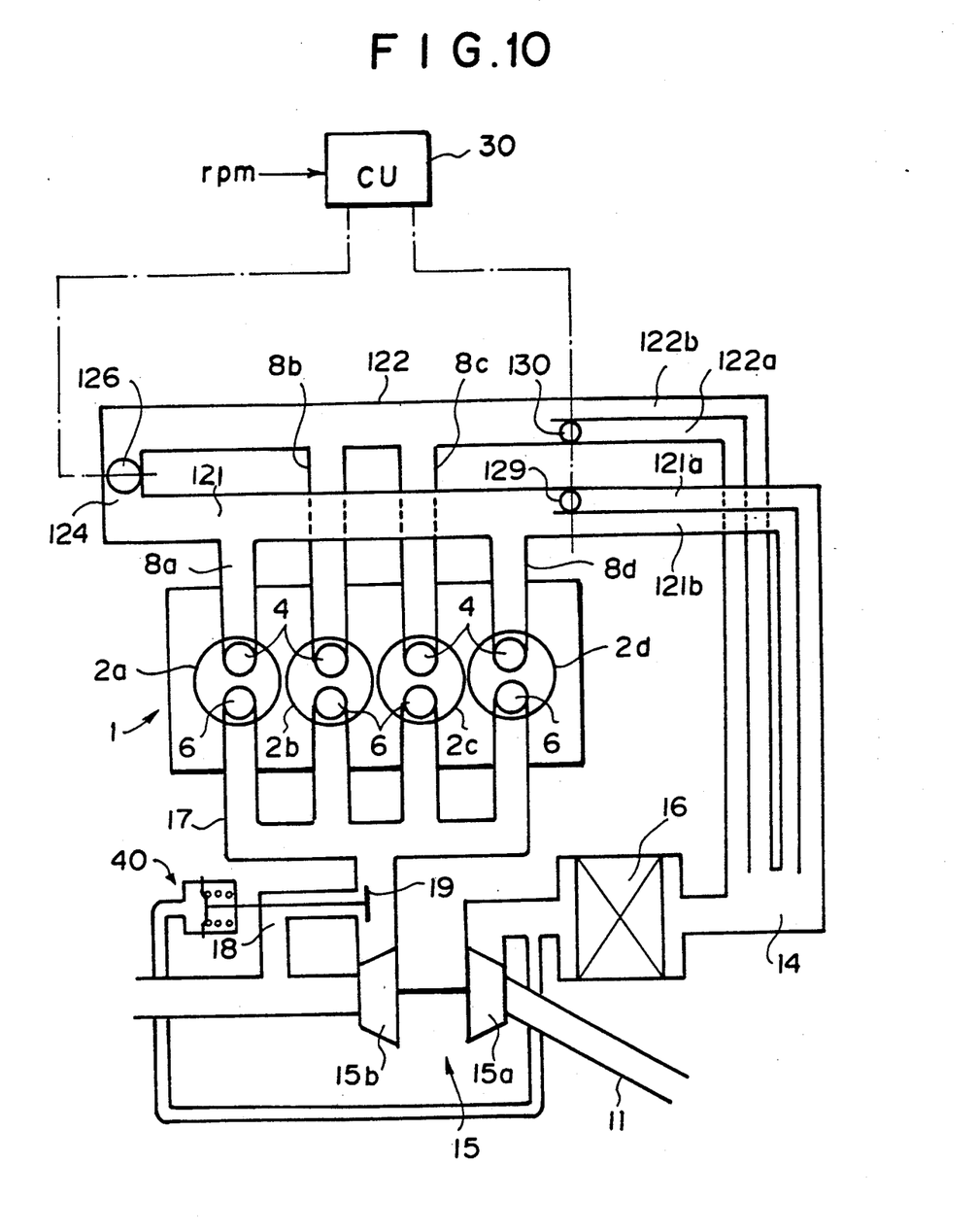
FIG. 10 is a schematic view showing an engine provided with an intake system in accordance with still another embodiment of the present invention.

FIG. 10 shows still another embodiment of the present invention. This embodiment is similar to the embodiment shown in FIG. 8, and accordingly the parts analogous to the parts shown in FIG. 8 are given the same reference numerals and will not be described here. In this embodiment, instead of communicating the first and second branch intake passages 121 and 122 by the communicating passage, the branch intake passages 121 and 122 are divided into two sections at the upstream end portions. That is, the first branch intake passage 121 is longitudinally divided into first and second sections 121a and 121b at the upstream end portion thereof, and the first section 121a is provided with an on-off valve 129. Similarly, the second branch intake passage 122 is longitudinally divided into first and second sections 122a and 122b at the upstream end portion thereof, and the first section 122a is provided with an on-off valve 130. The on-off valves 129 and 130 are integrally opened in the engine speed range higher than a first predetermined speed, and the on-off valve 126 in the downstream side communicating passage 124 is opened in the engine speed range higher than a second predetermined speed which is higher than the first predetermined speed. That is, in this embodiment, the intake system is also arranged to have three tuning engine speeds, i.e., a tuning engine speed for the lower speed pressure propagating path N1 (when the on-off valves 126, 129 and 130 are all closed), a tuning engine speed for the middle speed pressure propagating path N2 (when the on-off valves 129 and 130 are opened with the on-off valve 126 closed ) and a tuning engine speed for the higher speed pressure propagating path N3 (when the on-off valves 126, 129 and 130 are all opened). These three tuning engine speeds are set in the same manner as in the embodiment shown in FIG. 8.

Figure 11:
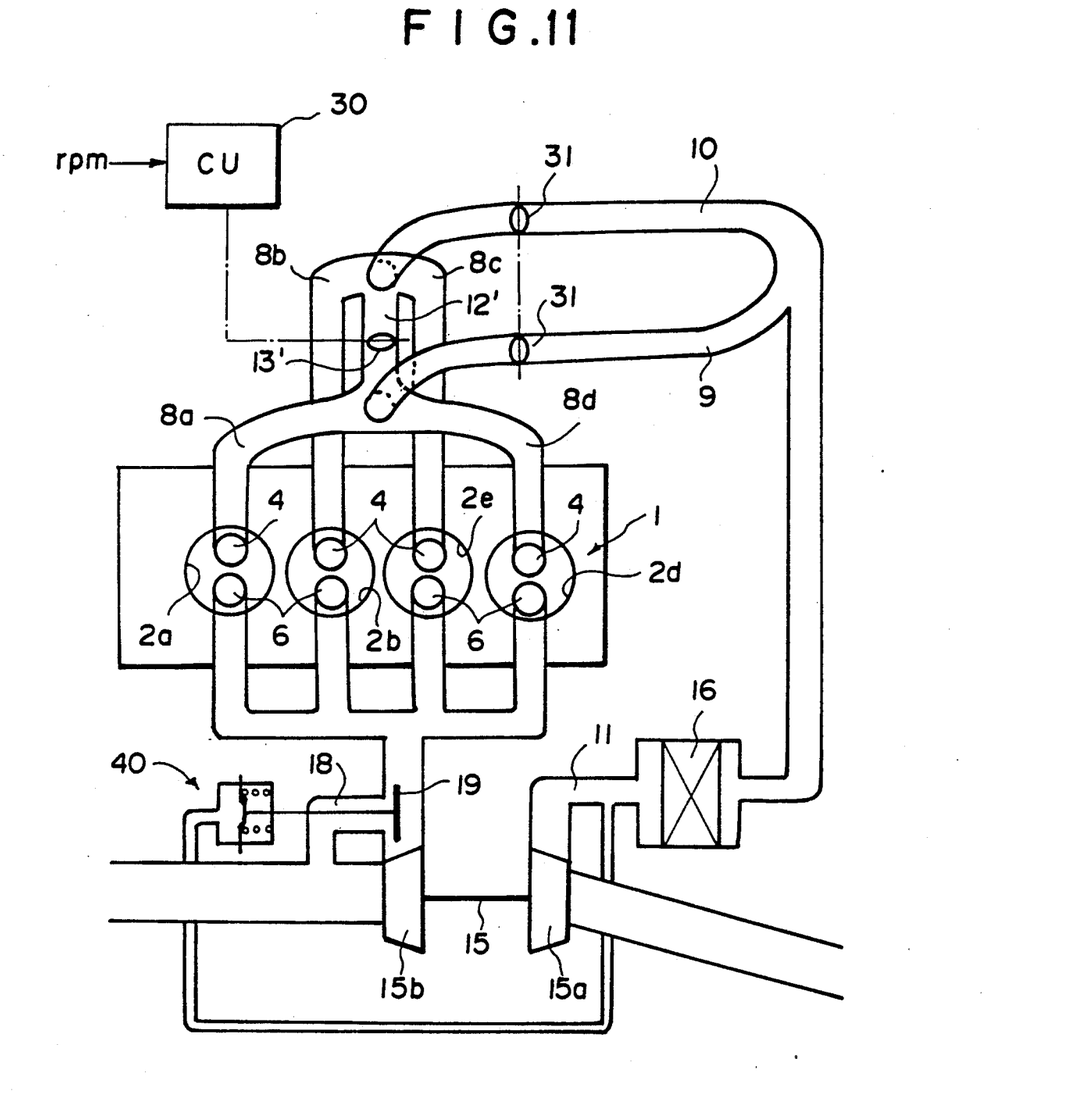
FIG. 11 is a schematic view showing an engine provided with an intake system in accordance with still another embodiment of the present invention.

FIG. 11 shows still another embodiment of the present invention. This embodiment is very similar to the embodiment shown in FIG. 1. Accordingly, only the difference from the embodiment shown in FIG. 1 will be described here. In this embodiment, the communicating passage 12' is provided to connect the junction of the discrete intake passages 8a and 8d to the first branch intake passage 9 and the junction of the discrete intake passages 8b and 8c to the second branch intake passage 10, and a single on-off passage 13' is provided in the communicating passage 12'. The operation of this embodiment is almost the same as that of the embodiment shown in FIG. 1.

Figure 12:
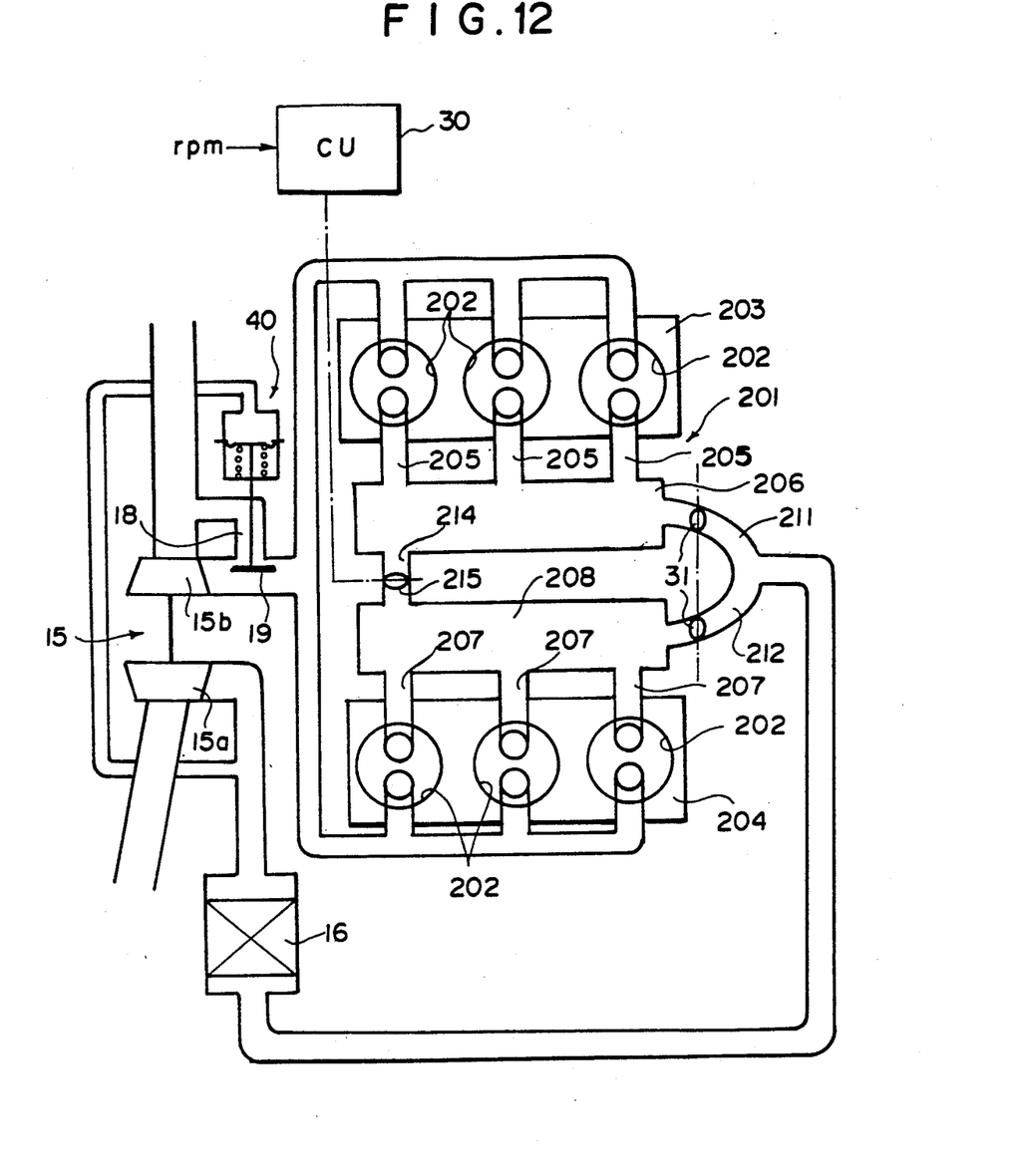
FIG. 12 is a schematic view showing an engine provided with an intake system in accordance with still another embodiment of the present invention.

FIG. 12 shows still another embodiment of the present invention. The intake system of this embodiment is applied to a V-6 engine 201. The engine 201 has six cylinders 202, three of them disposed in the right cylinder bank 203 and the other three disposed in the left cylinder bank 204. The three cylinders in each bank does not fire one after another. Each of the cylinders 202 in the right cylinder bank 203 is connected to a first enlarged volume chamber 206 by way of discrete intake passage 205, and each of the cylinders 202 in the right cylinder bank 204 is connected to a second enlarged volume chamber 208 by way of discrete intake passage 207. The first enlarged volume chamber 206 is connected to a first branch intake passage 211 at the upstream end and the second enlarged volume chamber 208 is connected to a second branch intake passage 212 at the upstream end. The first and second enlarged volume chambers 206 and 208 are communicated with each other by a communicating passage 214 at the respective downstream ends. The communicating passage 214 is provided with an on-off valve 215 which are opened in the engine speed range higher than a predetermined engine speed under the control of a control unit 30.

The intake system of this embodiment is arranged so that when the on-off valve 215 is closed, a resonance supercharging effect can be obtained at an engine speed lower than the predetermined engine speed, and when the on-off valve 215 is opened, a resonance supercharging effect can be obtained at an engine speed higher than the predetermined engine speed.

In this embodiment, the resonance tuning engine speed for the lower speed pressure propagating path No can be determined on the basis of the following formula.

$$No = 60 \times \tfrac{v}{3} + v\tfrac{3}{3} = 40 \times v$$

v represents the natural frequency the air column in the intake passage consisting of one of the branch intake passages, the enlarged volume chamber connected to the branch intake passage and the discrete intake passages connected to the enlarged volume chamber, and is given by the following formula.

$$v = a/4(lo + (3Vd + Vm + Ve)/F)$$

wherein lo represents the length of the branch intake passage (e.g., the first branch intake passage 211) between the enlarged volume chamber and the junction of the first and second branch intake passages 211 and 212, F represents the mean cross-sectional area of the branch intake passage, Ve represents the volume of the enlarged volume chamber, Vd represents the volume of each discrete intake passage, Vm represents the mean volume of the combustion chamber during the intake stroke, and a represents the speed of sound.

Also in this embodiment, the resonance tuning engine speed for the lower speed pressure propagating path No is set to be lower than the intercept engine speed when the on-off valve 215 is opened.

Instead of the illustrated waste gate valve, means for relieving the supercharging pressure in the intake system, or means for changing the capacity of the turbocharger may be employed as the supercharging pressure control means.

What is claimed:
1. An intake system for an engine comprising;
   an intake passage including a throttle valve, said intake passage communicating with a combustion chamber of the engine at one end and with the atmosphere at the other end,
   a turbocharger having a turbine disposed in an exhaust passage of the engine to be rotated under the pressure of exhaust gas flowing through the ex- haust passage and a compressor disposed in the intake passage and operatively connected to the turbine to be driven by the turbine, a supercharging pressure control means for limiting a supercharging pressure downstream of the compressor so as not to exceed a predetermined value, said intake passage having first and second pressure propagating paths downstream of the compressor, and a switching means for changing the pressure propagating paths in response to at least an engine speed so that a pressure wave generated by an intake stroke of the combustion chamber is propagated substantially along the first pressure propagating path when the engine operates at a low engine speed range and substantially along the second pressure propagating path when the engine operates at a high engine speed range, wherein a portion of the intake passage defining the first pressure propagating path being arranged so that a supercharging effect by a kinetic effect of intake air which reaches a maximum level at a predetermined engine speed in the low engine speed range can be obtained, and a portion of the intake passage defining the second pressure propagating path being arranged so that a supercharging effect by a kinetic effect of intake air is better in the high engine speed range when the pressure wave is propagated along the second pressure propagating path than when the pressure wave is propagated along the first pressure propagating path, and said predetermined engine speed being lower than an intercept engine speed for the second pressure propagating path which is the engine speed at which the supercharging pressure control means will begin to operate to limit the supercharging pressure when the engine speed is increased with the throttle valve wide opened while the pressure wave is propagated along the second pressure propagating path.

2. An intake system as defined in claim 1 in which said portion of the intake passage defining the second pressure propagating path is arranged so that a supercharging effect by a kinetic effect of intake air which reaches a maximum level at a predetermined engine speed in the high engine speed range can be obtained.

3. An intake system as defined in claim 1 in which said switching means switches the pressure propagating path to the second pressure propagating path at an engine speed higher than the intercept engine speed for the second pressure propagating path.

4. An intake system as defined in claim 1 in which the geometric compression ratio of the combustion chamber is larger than 9.

5. An intake system as defined in claim 4 in which the geometric compression ratio of the combustion chamber is larger than 10.

6. An intake system as defined in claim 1 in which the closure timing of the intake valve being set not before 40 degrees past BDC, the intake valve being considered to be closed when the valve lift is not more than 1 mm.

7. An intake system as defined in claim 6 in which the closure timing of the intake valve being set not before 50 degrees past BDC, the intake valve being considered to be closed when the valve lift is not more than 1 mm.

8. An intake system as defined in claim 1 in which said engine has a plurality of cylinders and the cylinders are divided into two groups so that the intake strokes of the cylinders in each group differ from each other in timing by 360 degrees, the cylinders in the two groups being respectively connected to a pair of branch intake passages each having a pair of pressure reflecting portions which are at different distances from the cylinders in each group said switching means making inoperative the pressure reflecting portion nearer to the cylinders when the pressure wave generated by the intake stroke of the combustion chamber is to be propagated substantially along the first pressure propagating path and making it operative when the pressure wave generated by the intake stroke of the combustion chamber is to be propagated substantially along the second pressure propagating path.

9. An intake system as defined in claim 8 in which said engine has four cylinders.

10. An intake system for an engine comprising:

an intake passage which communicates with a combustion chamber of the engine at one end by way of an intake port and with the atmosphere at the other end, an intake valve for opening and closing the intake port, a turbocharger which has a turbine disposed in an exhaust passage of the engine to be rotated under the pressure of exhaust gas flowing through the exhaust passage and a compressor disposed in the intake passage and operatively connected to the turbine to be driven by the turbine, a supercharging pressure control means for limiting a supercharging pressure downstream of the compressor so as not to exceed a predetermined value, said intake passage having first and second pressure propagating paths downstream of the compressor, and a switching means for changing the pressure propagating paths in response to at least an engine speed so that the pressure wave generated by an intake stroke of the combustion chamber is propagated substantially along the first pressure propagating path when the engine operates at a low engine speed range and substantially along the second pressure propagating path when the engine operates at a high engine speed range, wherein a portion of the intake passage defining the first pressure propagating path being arranged so that a supercharging effect by a kinetic effect of intake air which reaches a maximum level at a predetermined engine speed in the low engine speed range can be obtained, a portion of the intake passage defining the second pressure propagating path being arranged so that a supercharging effect by a kinetic effect of intake air is better in the high engine speed range when the pressure wave is propagated along the second pressure propagated along the first pressure propagating path, and the closure timing of said intake valve is set not before 40 degrees past BDC, with the intake valve being considered to be closed when the valve lift is not more than 1 mm.

11. An intake system as defined in claim 10 in which said portion of the intake passage defining the second pressure propagating path is arranged so that a supercharging effect by a kinetic effect of intake air which reaches a maximum level at a predetermined engine speed in the high engine speed range can be obtained.

12. An intake system as defined in claim 10 in which said switching means switches the pressure propagating path to the second pressure propagating path at an engine speed higher than the intercept engine speed for the second pressure propagating path.

13. An intake system as defined in claim 10 in which the geometric compression ratio of the combustion chamber is larger than 9.

14. An intake system as defined in claim 13 in which the geometric compression ratio of the combustion chamber is larger than 10.

15. An intake system as defined in claim 14 in which the closure timing of the intake valve being set not before 50 degrees past BDC, the intake valve being considered to be closed when the valve lift is not more than 1 mm.

16. An intake system as defined in claim 10 in which said engine has a plurality of cylinders and the cylinders are divided into two groups so that the intake strokes of the cylinders in each group differ from each other in timing by 360 degrees, the cylinders in the two groups being respectively connected to a pair of branch intake passages each having a pair of pressure reflecting portions which are at different distances from the cylinders in each group, said switching means making inoperative the pressure reflecting portion nearer to the cylinders when the pressure wave generated by the intake stroke of the combustion chamber is to be propagated substantially along the first pressure propagating path and making it operative when the pressure wave generated by the intake stroke of the combustion chamber is to be propagated substantially along the second pressure propagating path.

17. An intake system as defined in claim 16 in which said engine has four cylinders.

* * * * *